Oct. 21, 1958

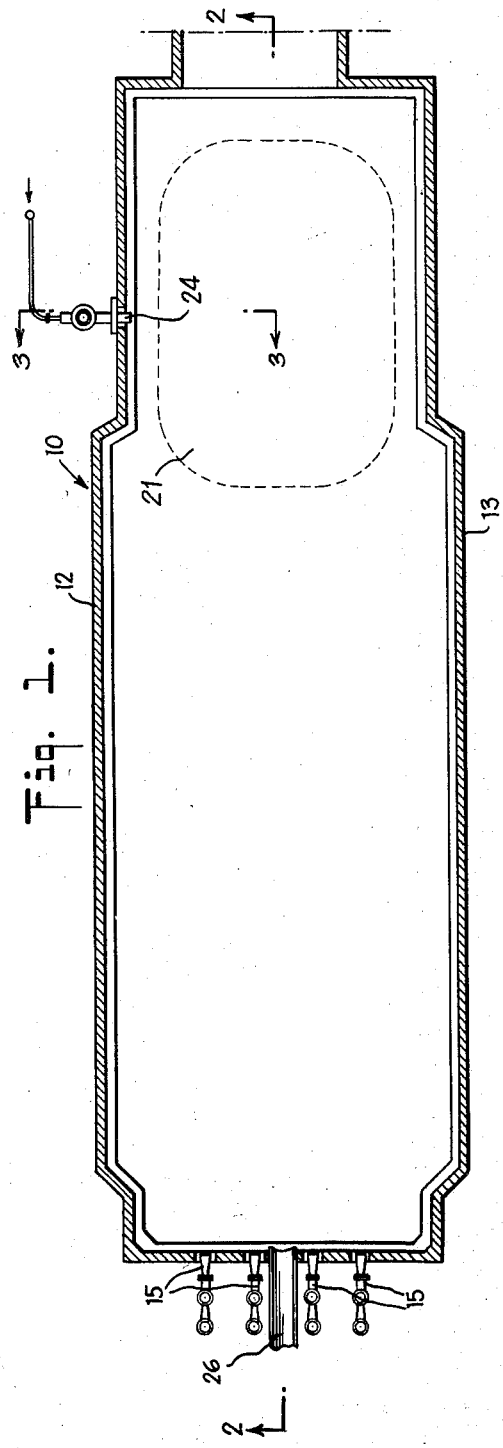
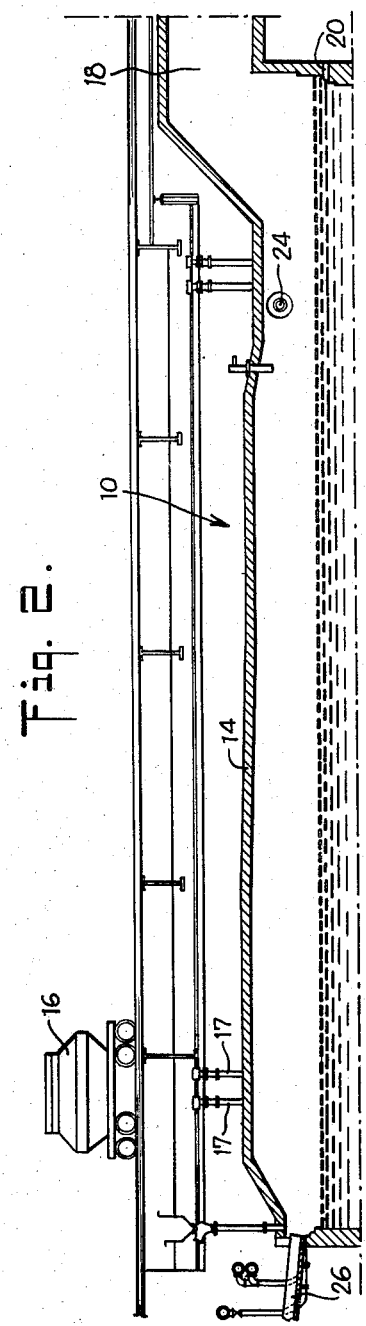

J. N. ANDERSON 2,857,263

METHOD FOR REDUCING METAL LOSSES IN
REVERBERATORY FURNACE SLAG

Filed July 26, 1956

INVENTOR.
JOHN N. ANDERSON
BY
ATTORNEY

United States Patent Office 2,857,263
Patented Oct. 21, 1958

2,857,263

METHOD FOR REDUCING METAL LOSSES IN REVERBERATORY FURNACE SLAG

John N. Anderson, Noranda, Quebec, Canada, assignor to Noranda Mines, Limited, Toronto, Ontario, Canada, a corporation of Canada Application July 26, 1956, Serial No. 600,219

Claims priority, application Canada October 15, 1955

4 Claims. (Cl. 75—24)

The present invention relates to a method of reducing metal losses in reverberatory furnace slag. Particularly, the present invention is useful for reducing the loss of one or more metals in the slag resulting from the smelting of non-ferrous metals on a commercial scale. This slag is normally discarded following such melting process, so that any metals contained therein in any form are lost.

In the metallurgy of copper as well as in that of nickel and some other base metals, it is common to effect a smelting operation in a reverberatory furnace. The charge to the reverberatory furnace may be a concentrate produced from an ore or ores of the metals to be recovered, such as copper or nickel and copper. Such concentrate may be produced by comminution of the original ore and treatment by the flotation process in which the valuable metal-bearing sulphides are separated from the valueless portion of the ore. By such a method of beneficiation, for example, concentrates containing 25% copper, may be produced from an original ore containing 1% copper, the purpose of this process of beneficiation being to reduce the quantity of material that must be smelted. In some instances, where beneficiation is not necessary or practicable, ores may be smelted directly after comminution for control of particle size. The reverberatory furnace charge may also include suitable fluxing material, for example, of a siliceous nature. The charge to a reverberatory furnace may comprise concentrates containing copper or nickel and copper, with or without direct smelting ore as described heretofore, and usually with fluxing material.

The furnace charge may be roasted to reduce the sulphur content before it is supplied to the reverberatory furnace. The hot roaster product is termed "calcine" and a furnace smelting this type of material is usually known as a "hot charged" furnace. Alternatively the furnace charge may be smelted without such prior roasting, in which case the furnace is usually known as a "wet charged" furnace; this term being derived from the fact that the concentrates which may make up the bulk of the furnace charge may have a considerable moisture content.

Any one or more of several methods may be used for introducing the reverberatory furnace charge into the reverberatory furnace. One method, which is referred to as "side-charging," comprises introducing the charge through apertures in the furnace roof along each side of the furnace, so that the charge is disposed in banks along the furnace side walls. This method of charging is described more fully hereinafter. Whatever the method of charging, the chief function of the furnace is the melting of the solid charge to form a liquid matte and a liquid slag, the matte (upon settling) occupying a lowermost layer and the slag, an uppermost layer due to the different specific gravities of these two liquid materials. The slag, which has a comparatively low content of the metals to be recovered, is periodically tapped from the furnace at a level above the top of the matte layer and may be discharged. The matte which contains a concentration of the metals to be recovered is usually processed in cylindrical vessels termed "converters," in which, during the first portion of the operation, the iron content of the charge is oxidized and fluxed to form a converter slag, which may be returned in liquid form to the reverberatory furnace. This liquid converter slag, when so returned, is not considered a part of the "solid charge" of the reverberatory furnace as that term is used in the industry and throughout the present description.

Reverberatory furnaces are conventionally constructed so as to have a firing end and a flue end. The firing end is that end at which fuel is supplied along with combustion-supporting air or, as it is commonly termed in the industry, "combustion air." The combustion takes place as the gases pass over the bath of liquid material toward the flue end, which is normally opposite the firing end. Products of combustion are withdrawn from the furnace at or adjacent to the flue end thereof. A typical type furnace which is in actual use at the present time is generally rectangular in shape as shown in the accompanying drawings, in which:

Figure 1 is a view in horizontal section taken at a level above the surface of the molten bath through a reverberatory furnace which may be operated in accordance with the present invention;

Fig. 2 is a view substantially in central vertical section on the line 2—2 of Fig. 1, but with the lower portion broken away.

Figure 3:
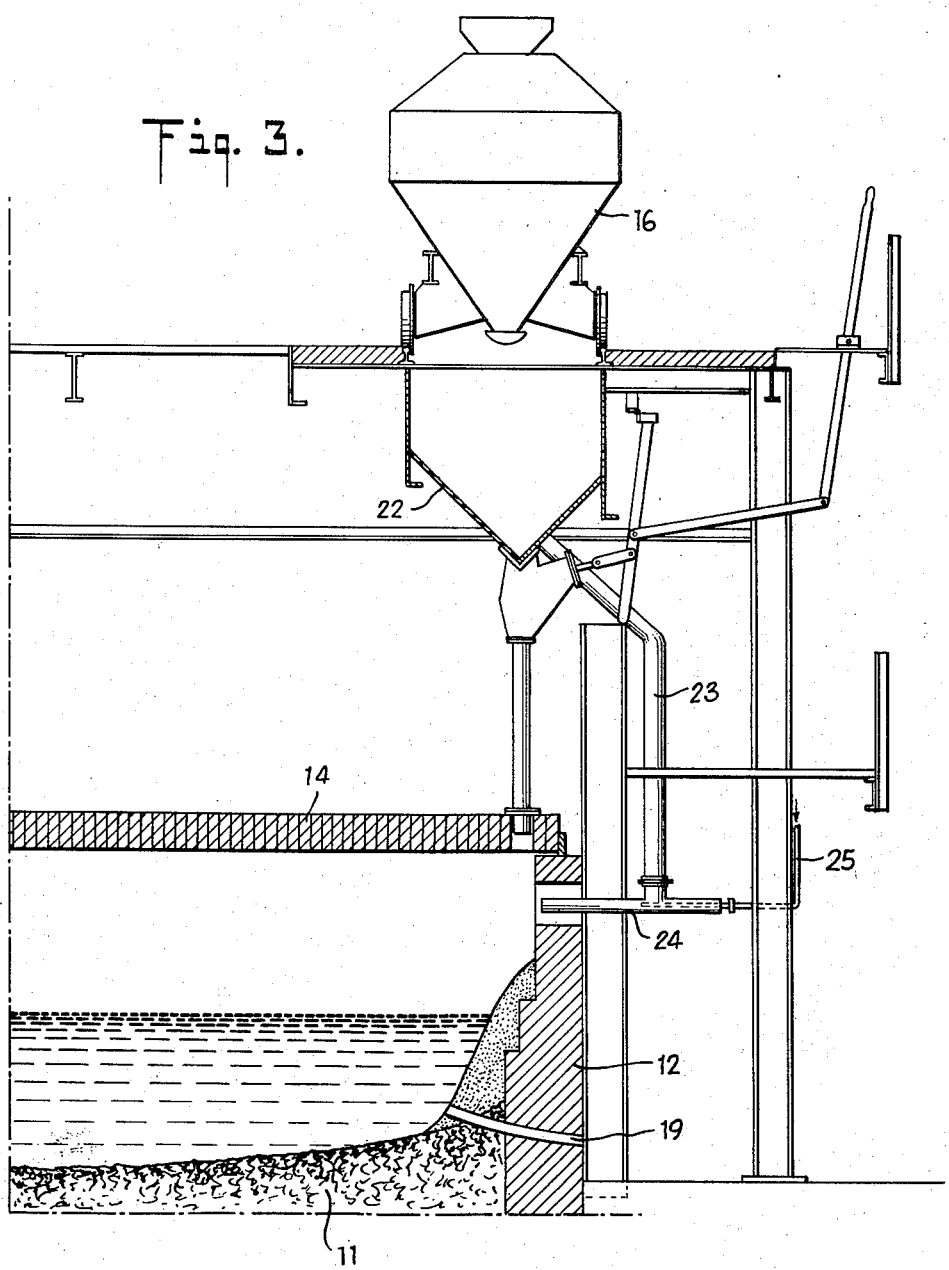
Fig. 3 is a fragmentary view, substantially in transverse vertical section on the line 3—3 of Fig. 1, certain parts being shown in elevation.

The furnace illustrated is one which is about 110 feet long and about 35 feet wide. Such a furnace can, for example, smelt about 1500 tons a day if "hot charged" or about 750 tons a day if "wet charged," each as above described.

The problem which has been presented and which the present invention solves in a practical commercial manner is that of substantially reducing the loss of metal values in the slag which is tapped from the furnace as aforesaid and discarded. As will be obvious from the description given above, if any of the metal or metals, which it is the purpose of the entire operation to recover, be so intimately intermixed with or dissolved in the slag that complete separation has not been effected at the time when the slag is discarded, then this metal or metals will be lost for all practical purposes.

In reverberatory furnace practice in the smelting of copper it has been found that the amount of copper normally lost in the slag is related to the slag composition and to the matte composition. For any particular set of slag and matte compositions, the copper content of the slag cannot practically be reduced below a certain figure, this same principle applying in the reverberatory furnace smelting of nickel-bearing materials. In order to reduce this metal loss, it has been proposed in the past to add to the slag some relatively low grade sulphide materials. In this category there should be included such sulphide materials as pyrite and pyrrhotite. One disclosure of such a treatment is in the U. S. patent to Butler and Stout, No. 1,416,262, issued May 16, 1922.

In this Butler et al. U. S. patent, there is added to the slag a material having a low copper content and a high iron sulphide content, which is referred to therein as a "washing ore." The patentees, however, teach that it is necessary in order to secure their desired results that additional heat be supplied over and above that amount which would normally be used in the smelting of the solid charge, so as to superheat the slag. The expressed theory of operation in this patent is that such superheating is a necessary and essential part of the slag washing or cleaning operation. In addition to this, Butler and his co-inventor apparently deem that the slag cleaning operation requires either (a) an additional furnace or (b) a special construction of furnace which would be more extensive and essentially different from the standard reverberatory furnaces as they have been known and used for many years. The prior art does not teach the essential features and practices necessary to permit slag washing to be effected in a standard reverberatory furnace and without the expenditure of excess fuel.

It has been found in accordance with the present invention that with an almost negligible and very inexpensive change in physical facilities, a standard reverberatory furnace can be operated to effect a substantial reduction in the losses of valuable metals in the slag without any substantial reconstruction of the furnace per se and without using any more heat than that which would otherwise be used in the ordinary operation of the furnace, so that substantial economies are effected by following the teachings of this invention.

The novel method of the present invention includes suitable control of the temperatures in that portion of the furnace at and adjacent to the flue end thereof, i. e., the end at which gases are exhausted therefrom, so as to maintain on the surface of the bath of slag a substantially viscous layer or skin. The slag is periodically withdrawn from this end portion of the furnace through one or more submerged tap holes, so that such viscous layer or skin is not substantially disturbed.

It has been found that when a sulphide material containing pyrite and/or pyrrhotite, with or without other metal sulphides, is supplied as a blanketing layer and in a special form, then a reduction of the metal losses in the slag can be effected in accordance with the present invention. It is further found necessary in accordance with this invention that this sulphide material so supplied shall consist essentially of sized particles, such that all will pass through a one inch screen and that all will be retained on a one-eighth inch screen. The preferred size range, however, is one in which all the particles will pass through a three-quarter inch screen and be retained on a one-quarter inch screen. By controlling the slag temperature in the zone in question, so as to create and maintain the viscous layer on the surface of the slag as aforesaid, an effective support is provided onto which a blanketing layer of sulphide material in sized particles can be distributed. By so maintaining the viscous layer, the blanket of sulphide material can be supported despite the fact that such sulphide material has a greater specific gravity than the slag. The blanketing layer of sulphide material may, for example, be initially in the order of magnitude of about one inch in thickness.

It has been found that too large particles will penetrate through the viscous layer due to their relatively great mass or will be so slow in melting as not to give the desired result in accordance with the present invention. On the other hand, too small particles tend to agglomerate together in islands or "floaters" on the surface of the slag and will not fuse to give the desired result in accordance with the present invention. The desired sized material also lends itself better to uniform distribution as a blanketing layer than would material having a large range of different sized particles.

It has been found that the amount of sulphide material so distributed as a blanket over the viscous layer at and adjacent to the flue end of the furnace should be in the order of magnitude of about 1% to about 5% by weight of the solid charge of the furnace, as hereinabove defined, and probably from about 2% to about 4% thereof in a preferred embodiment of the invention.

In accordance with a preferred practice in the operation of a reverberatory furnace according to the present invention, a substantial amount of slag is tapped from the furnace at regular intervals. In coordination with this practice there is introduced into the furnace and distributed onto the surface of the remaining slag therein, preferably immediately following each such tapping operation, a blanket of sulphide material as aforesaid, so that this blanketing layer may have a maximum time period to produce the desired results in accordance with the present invention.

Various theories have been advanced from time to time to explain metal losses in the slag, but these theories do not provide an explanation of why the present invention is effective. It is known, however, that when operating in accordance with the present invention, the temperature of the slag when tapped from the furnace is lower than it would be if the present invention were not practiced and the furnace operated otherwise in a conventional and standard manner. In the practice of the present invention it is believed that a reduction in the slag temperature within the furnace in a zone adjacent to the flue end thereof is a factor in reducing slag losses. When operating in accordance with conventional prior art practice it is found that on occasions some of the solid furnace charge floats on the surface of the slag toward the flue end of the furnace; and portions thereof may be drawn from the furnace with the slag as it is tapped periodically as aforesaid. When this occurs, there will be correspondingly high metal losses. When operating in accordance with the present invention, the blanketing layer prevents such floating solid material from floating to the flue end of the furnace so that it is melted and treated in accordance with the intended operation of the furnace, so that such periodic high losses are avoided.

Referring now to the accompanying drawings in which there is illustrated a furnace which may be operated in accordance with the present invention, there is shown a furnace, generally indicated at 10, which is of substantially standard commercial construction including a bottom formed of suitable refractory material and generally indicated at 11, side walls 12 and 13, the lower portions of which are of quite massive refractory construction, the side walls being held in place by the usual buckstays. Throughout a substantial distance along the furnace from the firing end, which is shown at the left in Figs. 1 and 2, the solid charge of the furnace is supplied from above to form a bank along each side of the furnace, serving to protect the side walls of the furnace. Toward the flue end of the furnace (at the right as seen in Figs. 1 and 2) the walls are protected by fettling material, such as a coarse siliceous ore, which has a steep angle of repose and, therefore, does not take up much lateral space in the furnace.

The furnace roof shown at 14 is preferably disposed so as gradually to constrict the free (cross sectional) area for the passage of flame and products of combustion in a manner which is calculated so as to give the most efficient utilization of the heat available in the fuel. Again the details and specific dimensions and ratios thereof per se form no necessary part of the present invention. Such details are, however, disclosed, for example, in an article written by the present inventor and published in the June 1954 edition of the "Journal of Metals," published by AIME.

At the firing end of the furnace, at the left as seen in Figs. 1 and 2, there are a plurality of burners generally indicated at 15. While any suitable fuel can be burned in a reverberatory furnace of the kind herein being described, the particular furnace with which the present invention has been practiced is fired by powdered coal, introduced into the furnace in a blast of air, through each of the four burners 15 shown in the drawings.

The solid charge for the furnace, i. e., the hot calcine, which is preferred in accordance with the practice used in the particular furnace being described, is supplied from the roasters to one or more suitable calcine cars, one of which is shown in Fig. 2 at 16. This car is arranged to supply its charge through a suitable bin and thence through ducts shown at 17 onto banks on each side of the furnace. As the charge is melted by the heat of the flame from the burning fuel it passes from the charge banks into the bath of molten material in the middle of the furnace and then flows to the flue end of the furnace shown at the right in Figs. 1 and 2, where the molten products are withdrawn from the furnace. The flue end of the furnace includes the off-take flue connection generally indicated at 18, through which the products of combustion pass out of the furnace.

In the furnace, separation between matte and slag begins as soon as the melted charge reaches the bath; and when the molten material reaches the flue end of the furnace, it has been resolved into an under layer of matte and an upper layer of slag, due to the different specific gravities of these two materials. The matte is drawn off from time to time through one of two or more tap holes, such as are illustrated in Fig. 3 at 19. The slag is also withdrawn from the furnace periodically through a tap hole as illustrated at 20 in Fig. 2 at the lower right hand portion thereof, this tap hole being located at a vertical level above the normal and desired top level of the matte layer and yet below the desired top level for the slag layer.

The method of the present invention involves the treatment of the molten materials in the zone of the furnace at and adjacent to the flue end thereof as indicated by the area within the dotted line 21, Fig. 1.

While it has been known for some time that it is possible to reduce the losses of metals in the slag by treating the slag with a material containing iron sulphides, the present invention reduces the loss of metals in the slag without requiring additional fuel or any separate furnace or any special furnace construction except the minor features herein described.

In accomplishing this object practically, it is desired that there be established and to a substantial extent maintained, a blanketing layer of sized particles of the sulphide material covering the slag layer zone in question. Because those sulphide materials which are suitable for use as this blanketing layer are higher in specific gravity than the slag itself, it is necessary to resort to particular expedients in order to prevent the sulphide material from sinking through the slag without forming the desired blanketing layer. The present invention avoids these difficulties by controlling the temperature of the slag in the area 21, so as to establish and maintain on the surface of the slag a substantially viscous layer or skin, which has sufficient strength or possibly surface tension (the exact theory of the operation being unknown) as to support the superficial blanketing layer of the sulphide material which is spread thereover according to the present invention. The maintenance of the surface of the slag at this somewhat lower temperature is assisted by the presence of the blanketing layer thereon.

The blanketing layer may be made up of particles of a sulphide material containing pyrite and/or pyrrhotite and possibly some copper and/or nickel sulphides, but in which the copper and/or nickel content is generally quite low. As aforesaid, the material for use as the blanketing layer should be in sized particles with oversized and undersized particles eliminated and with the size ranges within the limits given above, i. e., the outside and/or preferred limits as given above. The reasons for the selection of the particular sizes herein taught are also set forth hereinabove and will not be repeated.

The blanketing layer may be established by supplying the material in question from any suitable source thereof (not shown), for example, to and through one of the hopper cars 16 (Fig. 3), thence to and through a stationary hopper as shown at 22 (Fig. 3) and thence through a duct 23 to a gun type injector apparatus as indicated at 24, which preferably can be swiveled about so as to distribute the material over a substantial area, for example, the area indicated at 21, Fig. 1. The sized solid material may be projected into the furnace with the aid of a blast of compressed air supplied from a suitable source through a pipe as indicated at 25. While there is illustrated herein one type of means by which the material of the blanketing layer can be distributed over the zone to be blanketed, as indicated at 21 (Fig. 1), this means can be duplicated in a single furnace as desired or any other means, singly or in combination, for effecting this result may be used and considered the equivalent of the means herein shown and described for the purposes of the present invention.

The amount of the material supplied as a blanketing layer has been set forth hereinabove as a percentage of the solid charge of the furnace. Thus, in one day, for example, a furnace as illustrated in the accompanying drawings might be supplied with 1500 tons of solid charge. In addition to this, the matte which is withdrawn from the furnace is usually taken to one or more converters in which it is processed to produce, for example, metallic copper. In connection with the operation of the converters, a slag is formed containing substantially all the iron which is supplied to the converters as a part of the matte, the iron existing in the matte probably in the form of a double sulphide with copper. The converter slag is often returned to the reverberatory furnace as a liquid charge and is introduced through a chute or launder shown at 26 (Figs. 1 and 2). The weight of such returned liquid converter slag is not conventionally included in the calculation of the solid charge for the reverberatory furnace as that term is used herein. From another point of view, the blanketing layer of sulphide ore supplied in the zone 21 (Fig. 1) may perhaps be about one inch in thickness.

In one preferred manner of operating a reverberatory furnace, a substantial amount of slag is tapped from the furnace at fairly uniform timed intervals, for example, about every hour. Matte is tapped from the furnace as required by the converters and in amounts which are calculated to maintain the furnace in reasonably continuous stable operation. Following the tapping of slag as aforesaid and in order that the blanketing layer shall have a maximum time to work on the slag prior to the next tapping thereof, it has been found desirable to spread a predetermined amount of the blanketing material on top of the remaining slag. This blanketing material is gradually melted by the conjoint influence of the heat of the gases passing over the top thereof and the fusing influence of the slag therebeneath. In this way, however, the blanketing layer is never wholly melted and, in practice, serves to assist in keeping the slag at a somewhat lower temperature than that which it would otherwise have, this being easily ascertained by the temperature of the slag as tapped from the furnace. While it is contemplated that the blanketing layer could be established, maintained or replenished at any desired times and in any desired way, the coordination of the replenishment of the blanketing layer with the tapping of the slag as aforesaid is a preferred manner of operation in accordance with the present invention.

Thus, the only modification of a standard furnace required to carry out the present invention is the provision of means as shown at 23, 24 and 25 in Fig. 3 for supplying the blanketing layer, the furnace being otherwise operated in a substantially standard manner, except for a careful control of the firing for the establishment and maintenance of the substantially viscous layer atop the slag layer as hereinbefore stated for supporting the blanketing layer of sulphide ore.

In an actual full scale commercial test of the present invention in the smelting of copper ores and concentrates at Noranda, Province of Quebec, Dominion of Canada, two similar full sized furnaces were operated under conditions which were as closely parallel as commercial operation permits, using the same type charge for both furnaces and being operated twenty-four hours a day on a parallel basis, with the sole exception that the present invention was used in one of these two furnaces, while the other was operated without the application of this invention. The data hereinafter given as to these operations is comparable throughout. The entire operation in this manner took place covering a period of about three months. During one typical month of these three, the furnace operating without the present invention had an average copper loss in the slag of 0.329%; whereas the corresponding furnace operated in accordance with the present invention had a copper loss in the slag of 0.303%. It has been found that the losses of other metals, such as gold and silver, are closely related to the copper losses in that the higher the copper losses, the higher are the losses of gold and silver. During this month each of the furnaces in question made about 40,000 tons of slag, so that the saving, while apparently small as a percentage matter, amounted to about 10 tons of copper on the one furnace in connection with which the present invention was practiced. The actual operation required the services of one additional man part time on the furnace operated as aforesaid. The additional cost of operation of this furnace was small as compared with the value of the metals saved and the equipment required cost less than $1,000.00.

At many places where the process could be practiced, suitable sulphide material is readily available. In other places it might be necessary to mine this sulphide material as a separate product as well as to crush it and screen it to the desired particle size range. It was found in the practice of the present invention some valuable metals, such as copper, contained in the sulphide material were recovered in the process; and the value of this metal recovery exceeded the cost of the material itself. The process has, therefore, proved to be economically advantageous.

While there is herein shown and described but one physical embodiment of the invention, the principles thereof have been set forth in considerable detail, so as to enable those skilled in the art to carry out the method in different furnaces. I do not wish to be limited, therefore, except by the scope of the appended claims, which are to be construed validly as broadly as the state of the art permits.

What is claimed is:

1. The method of continuously operating a fuel-fired reverberatory furnace for the melting of base metal ores and concentrates thereof selected from the group consisting of ores and concentrates of copper, nickel and mixtures thereof, comprising the steps of supplying substantially all the fuel required by said furnace to a firing end thereof and in a direction generally longitudinally of the furnace, exhausting the products of combustion from a flue end of the furnace which is substantially opposite said firing end, supplying material to be smelted to the furnace along the sides thereof in that portion of the furnace nearer to the firing end up to a point spaced a substantial distance from the flue end thereof, withdrawing smelted matte through a submerged withdrawal passage located adjacent to the flue end of said furnace, continuously maintaining above the matte at least in the flue end of said furnace a layer of molten slag, the ore smelting to form both matte and slag and the slag floating upon the matte due to the relatively lower specific gravity thereof; and reducing the loss of valuable metals in the slag by controlling the temperature in a zone of the furnace adjacent to the flue end thereof to such a low point that there will be established and maintained in said zone a substantially viscous layer on the surface of the molten slag, introducing into the furnace and distributing onto said viscous layer in said zone a blanket of sulphide material, periodically withdrawing slag from the molten layer thereof at a point adjacent to said zone and solely through at least one submerged withdrawal passage, periodically supplying additional sulphide material to the blanket thereof in said zone so as continuously to maintain this blanket without substantial movement thereof through or out of said zone, and notwithstanding the melting of some portions thereof, so that said blanket will never be wholly melted, said sulphide material as supplied to said zone for establishing and maintaining said blanket consisting essentially of particles of sized material which will pass through a one-inch screen to be retained on an eight-inch screen and said sulphide material having a greater specific gravity than that of the slag onto which it is supplied as aforesaid, the amount of said sulphide material supplied as aforesaid being at least about 1% and not over about 5% of the total furnace charge of solid material, and the blanket which is maintained as aforesaid serving to reduce the temperature of said slag in said zone below that which the slag would have if the sulphide material were not supplied as aforesaid and other furnace operating conditions remained the same.

2. The method of operating a fuel-fired reverberatory furnace in accordance with claim 1, in which the particles of the sulphide material constituting said blanket are such as will pass through a three-quarter inch screen and be retained on a one-quarter inch screen.

3. The method of operating a fuel-fired reverberatory furnace in accordance with claim 1, in which the amount of said sulphide material supplied as aforesaid is from about 2% to about 4% of the total furnace charge of solid material.

4. The method of operating a fuel-fired reverberatory furnace in accordance with claim 1, in which substantial amounts of slag are tapped from the furnace at substantially predetermined time intervals; and in which, immediately following each such tapping of the slag, a substantial amount of sulphide material is distributed onto the surface of the bath in the furnace in said zone, so as periodically to replenish the blanket of sulphide material in said zone.

References Cited in the file of this patent

UNITED STATES PATENTS

| | | |
|---|---|---|
| 1,416,262 | Butler et al. | May 16, 1922 |
| 2,295,219 | Kalling | Sept. 8, 1942 |

OTHER REFERENCES

Handbook of Non-Ferrous Metallurgy, Liddell, page 951, top four paragraphs.

UNITED STATES PATENT OFFICE
CERTIFICATE OF CORRECTION

Patent No. 2,857,263                                  October 21, 1958

John N. Anderson

It is hereby certified that error appears in the printed specification of the above numbered patent requiring correction and that the said Letters Patent should read as corrected below.

Column 2, line 1, for "discharged" read -- discarded --; column 7, line 51, for "melting" read -- smelting --.

Signed and sealed this 6th day of January 1959.

(SEAL)
Attest:

KARL H. AXLINE
Attesting Officer

ROBERT C. WATSON
Commissioner of Patents